United States Patent
Yang et al.

(10) Patent No.: US 7,987,413 B2
(45) Date of Patent: Jul. 26, 2011

(54) SYSTEMS AND METHODS FOR ENCODING A CONTROL CHANNEL IN A WIRELESS COMMUNICATION SYSTEM

(75) Inventors: Hong Kui Yang, San Diego, CA (US); Jian Gu, Beijing (CN); Pengcheng Su, Beijing (CN)

(73) Assignee: Via Telecom, Inc., San Diego, CA (US)

( * ) Notice: Subject to any disclaimer, the term of this patent is extended or adjusted under 35 U.S.C. 154(b) by 910 days.

(21) Appl. No.: 11/945,410

(22) Filed: Nov. 27, 2007

(65) Prior Publication Data

US 2008/0134002 A1    Jun. 5, 2008

Related U.S. Application Data

(60) Provisional application No. 60/868,150, filed on Dec. 1, 2006, provisional application No. 60/885,326, filed on Jan. 17, 2007.

(51) Int. Cl.
 *H03M 13/00*    (2006.01)

(52) U.S. Cl. .................................................. 714/786
(58) Field of Classification Search .................. 714/752, 714/758, 786
See application file for complete search history.

(56) References Cited

U.S. PATENT DOCUMENTS

| | | | |
|---|---|---|---|
| 6,216,107 B1 * | 4/2001 | Rydbeck et al. | 704/500 |
| 6,292,922 B1 * | 9/2001 | Ruscitto et al. | 714/795 |
| 6,430,724 B1 * | 8/2002 | Laneman et al. | 714/780 |

FOREIGN PATENT DOCUMENTS

CN    1496080    5/2004

* cited by examiner

*Primary Examiner* — Shelly A Chase
(74) *Attorney, Agent, or Firm* — Baker & McKenzie LLP

(57) ABSTRACT

A control channel encoder, e.g., in a UMB system, uses a channel structure that can efficiently transmit more information bits, yet achieve sufficient detection and false alarm performance. The control channel encoder uses tail-biting convolutional coding and Cyclical Redundancy Check (CRC).

20 Claims, 7 Drawing Sheets

SYSTEMS AND METHODS FOR ENCODING A CONTROL CHANNEL IN A WIRELESS COMMUNICATION SYSTEM

RELATED APPLICATIONS INFORMATION

This application claims priority under 35 U.S.C. 119(e) to U.S. Provisional Patent Application Ser. No. 60/868,150, entitled "F-PQICH CODING FOR LBC FDD", filed Dec. 1, 2006, which is incorporated herein in its entirety as if set forth in full. Additionally, this application claims priority under 35 U.S.C. 119(e) to U.S. Provisional Patent Application Ser. No. 60/885,326, entitled "Coding for F-FOSICH and F-IOTCH in LBC", filed Jan. 17, 2007, which is incorporated herein in its entirety as if set forth in full.

BACKGROUND

Field of the Invention

It will be understood that in a wireless communication system certain traffic channels are used to communicate data, e.g., between a base station or wireless access point and a wireless communication device. It will also be understood that certain information is required in order for a wireless communication device to accurately receive and decode the traffic channel. For example, in a Code Division Multiple Access (CDMA) system, voice and data traffic can be carried in message frames of various lengths. A wireless communication device may need to decode a plurality of message frames in order determine the complete payload of information.

Control Channels such as Fast Pilot Quality Indicator Channel (F-PQICH), the Forward-Fast Other Sector Interference Channel (F-FOSICH), the Forward-Other Sector Interference Channel (F-OSICH), the Forward-Interference Over Thermal Channel (F-IOTCH), the Reverse-CDMA Dedicated Control Channel (R-CDCCH), and the Reverse-Shared Control Channel (R-SCCH), convey information e.g., the Fast Pilot Quality Indicator Channel (F-PQICH) carries quantized values of reverse link (RL) pilot strength for each active terminal (AT), the Forward-Fast Other Sector Interference Channel (F-FOSICH) carries an other sector interference indication transmitted at a faster rate but with less coverage than the Forward-Other Sector Interference Channel (F-OSICH).

The term "wireless communication device" as used in this description and the claims that follow is intended to refer to any device capable of wireless communication with, e.g., a base station or wireless access point. Thus, the term "wireless communication device" includes, but is not limited to, cellular telephone type devices, also known as handsets, mobiles, mobile handsets, mobile communication devices, etc., Personal Digital Assistants (PDAs) with wireless communication capability, smartphones, computing devices with wireless communication capability including handheld computers, laptops, or even desktop computers, etc.

It will also be understood that while many of the examples and embodiments provided herein refer to Wireless Wide Area Networks (WWANs), the systems and methods described herein can also be applied to Wireless Personal Area Networks (WPANs), Wireless Local Area Networks (WLANs), Wireless Metropolitan Area Networks (WMANs), etc. It will also be understood that such networks include some type of access device or infrastructure such as a base station, e.g., in a WWAN or WMAN, or an access point, e.g., in a WLAN. It will be understood therefore that reference to these access devices/infrastructures are interchangeable and that reference to one should not exclude reference to another unless explicitly stated or where such is dictated by the context of the reference.

SUMMARY

Systems and methods for implementing a control channel, e.g., in a UMB system, are presented below. The channel structure used to implement the control channel can efficiently transmit more information bits, yet achieve sufficient detection and false alarm performance uses tail-biting convolutional coding and Cyclical Redundancy Check (CRC).

In one aspect, a transmitter design is presented that embodies the above encoding techniques. Such a transmitter design can be incorporated into uplink or downlink transmitter designs as required. The transmitter comprising a channel encoder configured to encode information bits onto a control channel, the transmitter comprising a cyclical redundancy check (CRC) encoding block configured to receive the information bits, generate CRC bits, and add the CRC bits to the information bits forming input symbols, a tail-biting convolutional encoder coupled with the CRC encoding block, the tail-biting convolutional encoder configured to generate output symbols from the input symbols using a tail biting technique, wherein said tail-biting convolutional encoder convert (k) input bits into a sequence of (n) bits using the formula $R=k/n$, wherein (R) is the effective rate of the encoder and $k=b+c$, wherein (b) is a plurality of bits generated by the CRC from the information bits and (c) is the number of CRC bits generated by the CRC encoding block, and a modulation block configured to modulate the output symbols.

In another aspect, a method for encoding a control channel signal is presented that embodies the various techniques described above and below. The method for encoding information bits onto a preamble channel comprises: receiving the information bits, generating CRC bits, configure to do the CRC check of the information bits; adding the CRC bits to the information bits forming input symbols at an effective rate (R), generating output symbols from the input symbols using a tail biting technique; converting (k) input bits into a sequence of (n) bits, configured by the formula $R=k/n$, wherein $k=b+c$ and (b) is a plurality of bits generated from the information bits and (c) is the number of CRC bits; and modulating the output symbols.

In still another aspect, an access point is provided that comprises a receiver configured to receive coded signals; a transmitter configured to generate coded signals for transmission, the transmitter comprising a channel encoder configured to encode information bits, the channel encoder comprising a cyclical redundancy check (CRC) encoding block configured to receive the information bits, generate CRC bits, and add the CRC bits to the information bits forming input symbols; a tail-biting convolutional encoder coupled with the CRC encoding block, the tail-biting convolutional encoder configured to generate output symbols from the input symbols using a tail biting technique and convert (k) input bits into a sequence of (n) bits, configured by the formula $R=k/n$, wherein (R) is the effective rate of the encoder and $k=b+c$, wherein (b) is a plurality of bits generated by the CRC from the information bits and (c) is the number of CRC bits generated by the CRC encoding block, and a modulation block configured to modulate the output symbols.

In still another aspect, a mobile unit is provided that comprises a receiver configured to receive coded signals, a transmitter configured to generate coded signals for transmission, the transmitter comprising a channel encoder configured to encode information bits, the channel encoder comprising a cyclical redundancy check (CRC) encoding block configured to receive the information bits, generate CRC bits, and add the CRC bits to the information bits forming input symbols, a tail-biting convolutional encoder coupled with the CRC encoding block, the tail-biting convolutional encoder configured to generate output symbols from the input symbols using a tail biting technique and convert (k) input bits into a sequence of (n) bits, configured by the formula R=k/n, wherein (R) is the effective rate of the encoder and k=b+c, wherein (b) is a plurality of bits generated by the CRC from the information bits and (c) is the number of CRC bits generated by the CRC encoding block, and a modulation block configured to modulate the output symbols.

These and other features, aspects, and embodiments of the invention are described below in the section entitled "Detailed Description."

BRIEF DESCRIPTION OF THE DRAWINGS

Features, aspects, and embodiments of the inventions are described in conjunction with the attached drawings, in which.

DETAILED DESCRIPTION

The embodiments described below provide for control channel encoding that can efficiently transmit preamble information bits. The embodiments use tail-biting convolutional coding and CRC coupled with modulation schemes such as BPSK, QPSK or QAM. The embodiments described below are generally described in terms of QPSK; however, it will be understood that this does not exclude the use of other modulation techniques and is simply done for convenience Further, after tail-biting convolutional encoding and modulation, the modulated symbols can be further transformed according to the air interface standard being implemented, e.g., CDMA or OFDM, for transmission. For example, the signal can be transformed into an OFDM subcarrier waveform, e.g., with or without multiple antennas (Multiple In Multiple Out (MIMO)) or beam-forming.

Implementation of the embodiments described below result in a frame structure with reduced overhead symbols, which allows for increased capability and a more efficient design. Further, such a frame structure requires lower transmission power or a lower signal to noise (Eb/N0) ratio in the receiver to achieve similar false alarm and missing detection performance as conventional solutions. Additionally, in some embodiments, it is unnecessary to make any tradeoff between false alarm and missing detection probabilities, because the CRC bit, as well as the information bits in certain implementations, including user information, transmission format information, and/or subcarrier or channelization code, etc., can be used to check errors. In some embodiments, the factors influencing the tradeoff between false alarm rates and missing detection probabilities include the number of CRC bits and the required false alarm rate. If the number of CRC bits is too few to provide a low false alarm rate, the tradeoff still exists.

The embodiments described herein can be used to implement various control channels in a, e.g., UMB system. Accordingly, the requirements for a particular channel should be taken into consideration when implementing the embodiments described herein.

Figure 1:
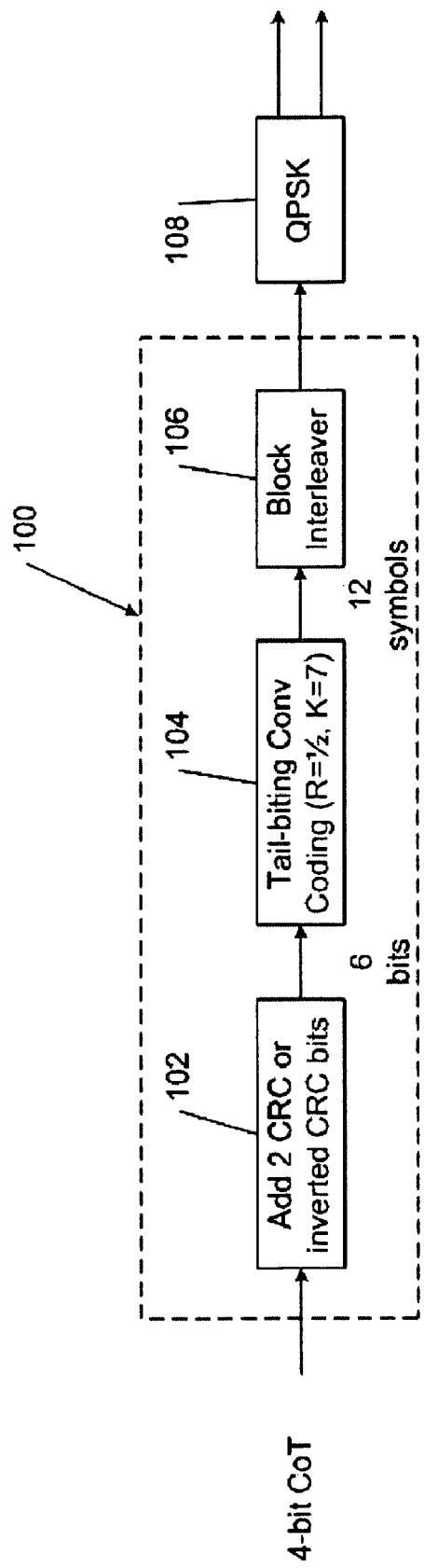
FIG. 1 is a diagram illustrating an example control channel encoder configured to encode the information bits for a control channel in accordance with one embodiment.

FIG. 1 is a diagram illustrating an example control channel encoder 100 configured in accordance with one embodiment of the systems and methods described herein. The encoder of FIG. 1 can be included, for example, in a forward link or reverse link transmitter in a UHDR-DO system. For example, encoder 100 can be used on the forward link to transmit the Forward-Pilot Quality Indicator Channel (F-PQICH to wireless communication devices. Alternatively, the encoder 100 can be used on the reverse link to transmit the Reverse-CDMA Dedicated Control Channel (R-CDCCH), or the Reverse-Shared Control Channel (R-SCCH), to a receiver. It will be understood that the encoder of FIG. 1, as with all embodiments described herein, can be implemented in software, hardware, or some combination thereof.

Thus, the encoder of FIG. 1 can be used to encode the indication information, e.g. the strength of reverse link pilots of each active terminal (in F-PQICH), which is often provided as 4-bits of information. As can be seen, encoder 100 comprises a CRC block 102 configured to receive the e.g., 4-bit indictor to generate a certain number of bits (b). CRC block 102 is configured to then add CRC bits (c) to the sequence of input data bits (b). In the example of FIG. 1, a 4-bit indicator generates a 4-bit data stream. Two CRC bits (c) are added to the input bits (b) to form a 6-bit symbol that is then input to tail biting convolutional encoder 104. In certain implementations, the use of inverted CRC bits (c) can provide a slight performance improvement; however, it will be understood that in other embodiments, non-inverted CRC bits (c) can be added in CRC block 102. CRC bits can be used for alarm or missing detection probability determination in the receiver. An example implementation of CRC block 102 is described in more detail below.

The output of CRC block 102 will then comprise (b+c) bits and will be input to tail biting convolutional encoder 104. As will be understood, a convolutional encoder converts (k) input bits, in this case k=b+c, into a sequence of (n) bits. The n-bit sequence, or symbol, can then be used to determine the k bits in the receiver. Thus, the effective rate (R) of encoder 104 is R=k/n.

It will be understood that in a conventional convolutional encoder, a tail sequence must be added to the end of the generated sequence in order to properly end the encoding process. The tail sequence is typically a series of "0's," which add to the overhead associated with the data control channel. Tail biting means that the encoder starts in the state given by the (m) last bits of the information sequence, where m is the size of the memory, or length of the register included in the encoder. Hence, the encoder starts and ends in the same state and thus the loss in rate of the code associated with conventional convolutional encoders is eliminated. In other words, the need for the tail sequence can be eliminated, which reduces overhead.

In certain embodiments, the convolutional encoding generator polynomials can be, e.g., 0157 and 0127 in octet.

The output of tail biting convolutional encoder 104 is then input to block interleaver 106. Interleaving is a way to arrange data in a non-contiguous way in order to increase performance. Interleaving is mainly used in digital data transmission technology to protect the transmission against burst errors. These errors overwrite a lot of bits in a row, but seldom occur. Interleaving is used to solve this problem. All data is transmitted with some control bits (independently from the interleaving), such as error correction bits that enable the channel decoder to correct a certain number of altered bits. If a burst error occurs, and more than this number of bits is altered, the codeword cannot be correctly decoded. So the bits of a number of codewords, or symbols are interleaved and then transmitted. This way, a burst error affects only a correctable number of bits in each codeword, so the decoder can decode the codewords correctly.

The output of block interleaver 106 can then be modulated, e.g., using QPSK, and then mapped to certain OFDM tones for transmission as described in more detail below. During transmission, diversity gain should be exploited as much as possible. Accordingly, e.g., F-PQICH symbols can be transmitted on 3 tiles. Moreover, improved minimum Euclidian distance can be achieved using tail biting convolutional encoding and, e.g., inverted CRC bits as illustrated in FIG. 1. For example, a minimum Euclidian distance of 12 can be achieved.

Figure 2:
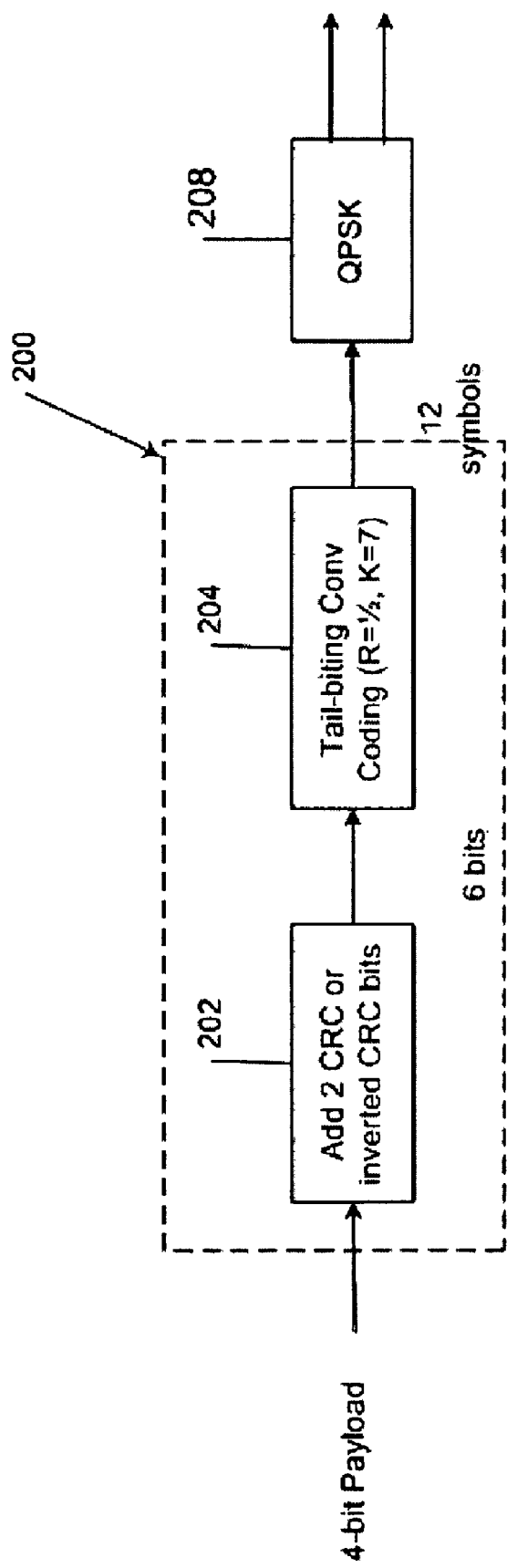
FIG. 2 is a diagram illustrating an example control channel encoder configured to encode the information bits for a control channel in accordance with a second embodiment.

FIG. 2 is a diagram illustrating an example control channel encoder 100 configured in accordance with one embodiment of the systems and methods described herein. The encoder of FIG. 1 can be included, for example, in a forward link or reverse link transmitter in a UHDR-DO system. Specifically, encoder 100 can be used on the forward link to transmit the Forward-Pilot Quality Indicator Channel (F-PQICH), the Forward-Fast Other Sector Interference Channel (F-FOS-ICH), or the Forward Interference Over Thermal Channel (F-IOTCH) to wireless communication devices. Alternatively, the encoder 100 can be used on the reverse link to transmit the Reverse-CDMA Dedicated Control Channel (R-CDCCH), or the Reverse-Shared Control Channel (R-SCCH), to a receiver.

It will be understood that the encoder of FIG. 2, as with all embodiments described herein, can be implemented in software, hardware, or some combination thereof.

Thus, the encoder of FIG. 2 can be used to encode the indication information, e.g. the other sector interference indication (in F-OSICH), or the interference over thermal information (in F-IOTCH), often 4-bits. Each of these channels can require a low error rate, e.g., approximately as low as 1%, but can also tolerate a high error rate, e.g., approximately as high as 10%.

As can be seen, encoder 100 comprises a CRC block 102 configured to receive the, e.g., 4-bit indictor to generate a certain number of bits (b). CRC block 102 is configured to then add CRC bits (c) to the sequence of input data bits (b). In the example of FIG. 1, a 4-bit indicator generates a 4-bit data stream. Two CRC bits (c) are added to the input bits (b) to form a 6-bit symbol that is then input to tail biting convolutional encoder 104. In certain implementations, the use of inverted CRC bits (c) can provide a slight performance improvement; however, it will be understood that in other embodiments, non-inverted CRC bits (c) can be added in CRC block 102. CRC bits can be used for alarm or missing detection probability determination in the receiver. An example implementation of CRC block 102 is described in more detail below.

The output of CRC block 102 will then comprise (b+c) bits and will be input to tail biting convolutional encoder 104. As will be understood, a convolutional encoder converts (k) input bits, in this case k=b+c, into a sequence of (n) bits. The n-bit sequence, or symbol, can then used to determine the k bits in the receiver. Thus, the effective rate (R) of encoder 104 is R=k/n.

The output of tail biting convolutional encoder 104 can then be modulated, e.g., using QPSK, and then mapped to certain OFDM tones for transmission as described in more detail below. As with the embodiment of FIG. 1, the embodiments of FIG. 2 can provide increased minimum Euclidian distance, e.g., of 12, which can provide good erasure probability and low word error rate. Also, as with the embodiment of FIG. 1, the generator polynomials of, e.g., 0157 and 0127 in octet can be used.

Figure 3:
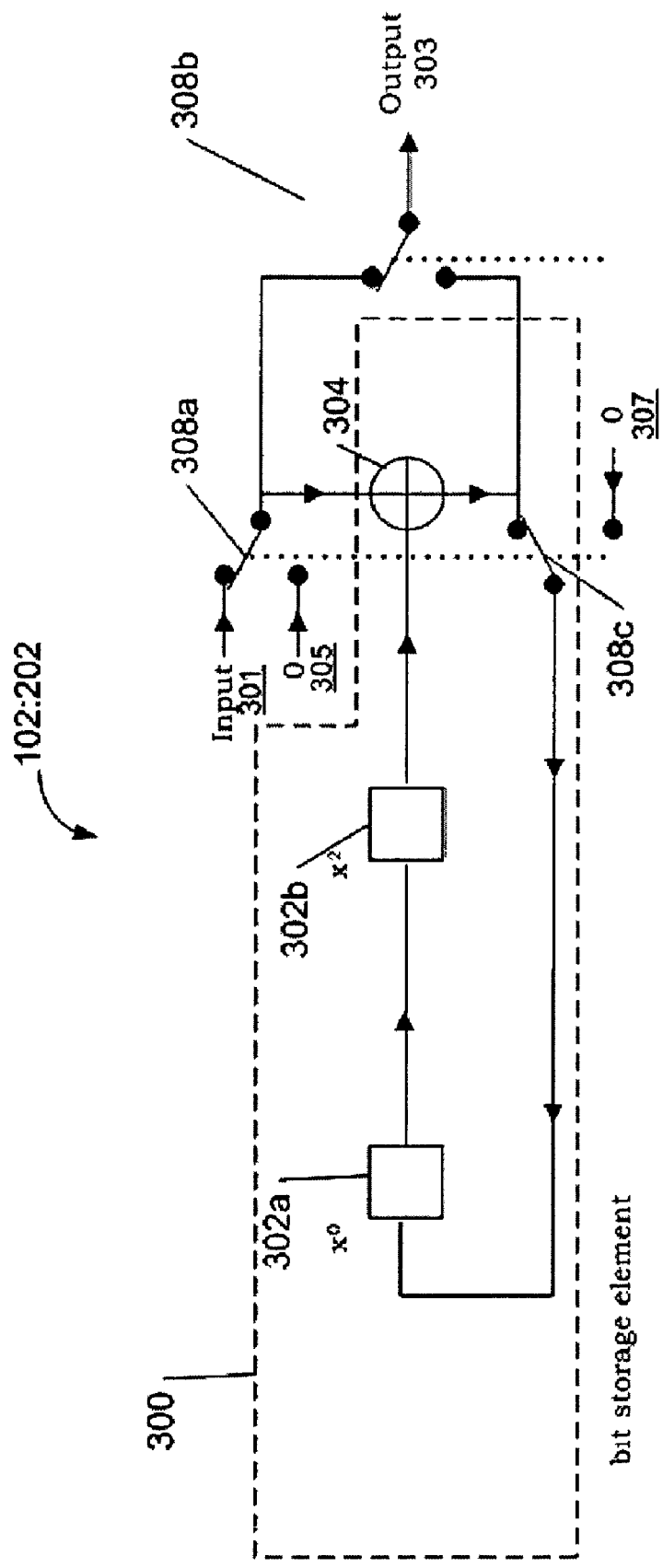
FIG. 3 is a diagram illustrating an example CRC generation circuit that can be included in the encoder of FIG. 1 in accordance with another embodiment.

FIG. 3 is a diagram illustrating an example implementation of CRC block 102 or 202 in accordance with one embodiment. As can be seen, the CRC block implementation of FIG. 3 comprises an input 301 at which the input bits (b) are received and an output 303 at which the output bits (k) are presented. The CRC block implementation of FIG. 3 further comprises 3 switches 308a, 308b, and 308c, which are in the up position while the information bits (b) are being received. Thus, the input bits (b) will simply be passed from input 301 to output 303.

In order to add the CRC bits, switches 308a, 308b, and 308c are moved to the down position, connecting inputs 305 and 307 with the encoder section 300. In this example, inputs 305 and 307 are configured to feed "0's" to encoder section 300. Encoder section 300 comprises 2 one-bit storage registers 302a and 302b, which are configured to store the input to each register for one clock cycle and then shift the input out to the right, and 1 modulo-2 adders 304. The output of adder 304 is then to output 303. In the example of FIG. 1, two CRC bits (c) are added to the information bits (b).

Figure 4:
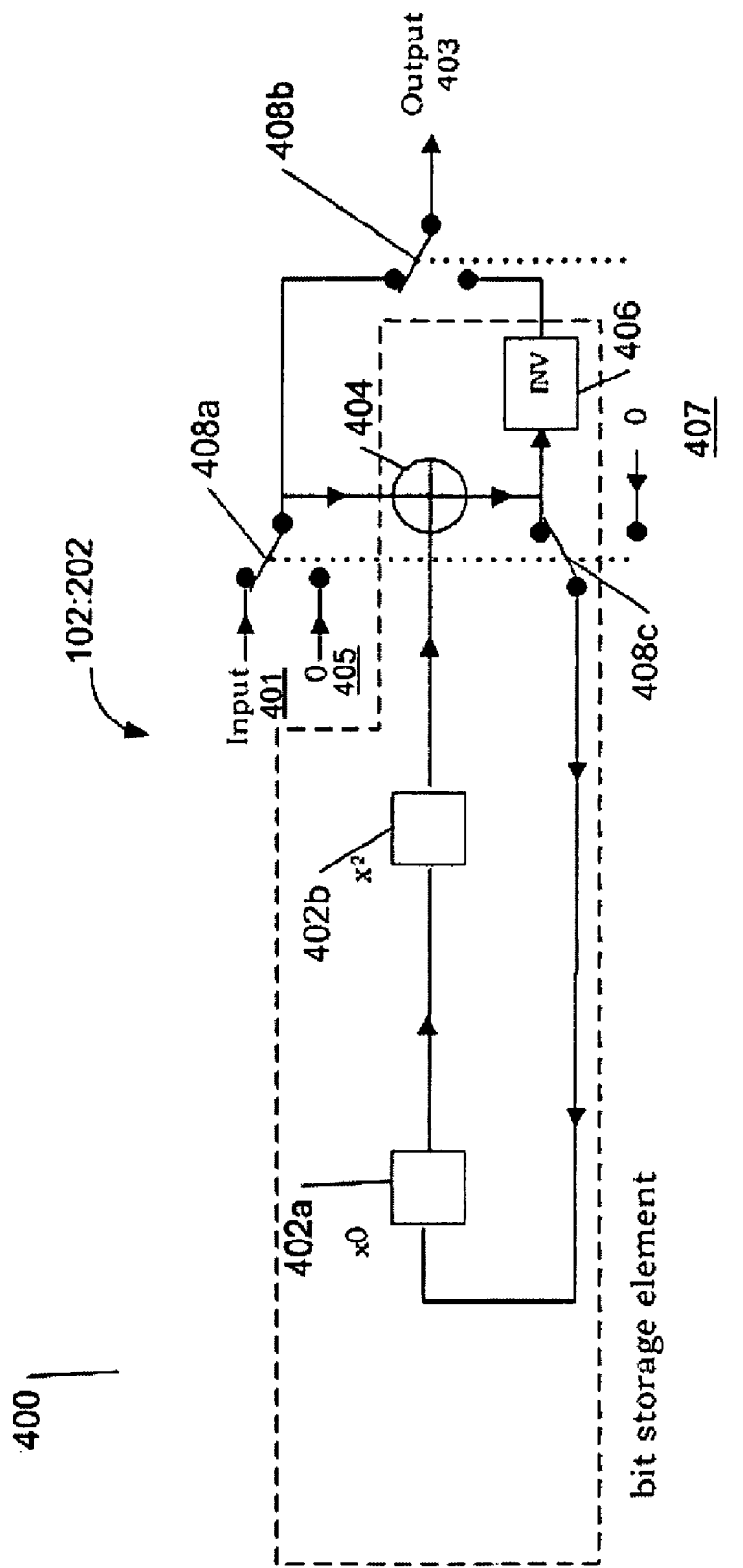
FIG. 4 is a diagram illustrating another example CRC generation circuit that can be included in the encoder of FIG. 1 in accordance with another embodiment.

FIG. 4 is a diagram illustrating an example implementation of CRC block 102 or 202 in accordance with another embodiment. As can be seen, the CRC block implementation of FIG. 4 comprises an input 401 at which the input bits (b) are received and an output 403 at which the output bits (k) are presented. The CRC block implementation of FIG. 4 further comprises 3 switches 408a, 408b, and 408c, which are in the up position while the information bits (b) are being received. Thus, the input bits (b) will simply be passed from input 401 to output 403.

In order to add the CRC bits, switches 408a, 408b, and 408c are moved to the down position, connecting inputs 405 and 407 with the encoder section 400. In this example, inputs 405 and 407 are configured to feed "0's" to encoder section 400. Encoder section 400 comprises 2 one-bit storage registers 402a and 402b, which are configured to store the input to each register for one clock cycle and then shift the input out to the right, and 1 modulo-2 adders 404. The output of adder 404 is then input to inverter 406, which is configured to invert the output of adder 404 and pass the inverted result to output 403. In the example of FIG. 1, two inverted CRC bits (c) are added to the information bits (b).

Figure 5:
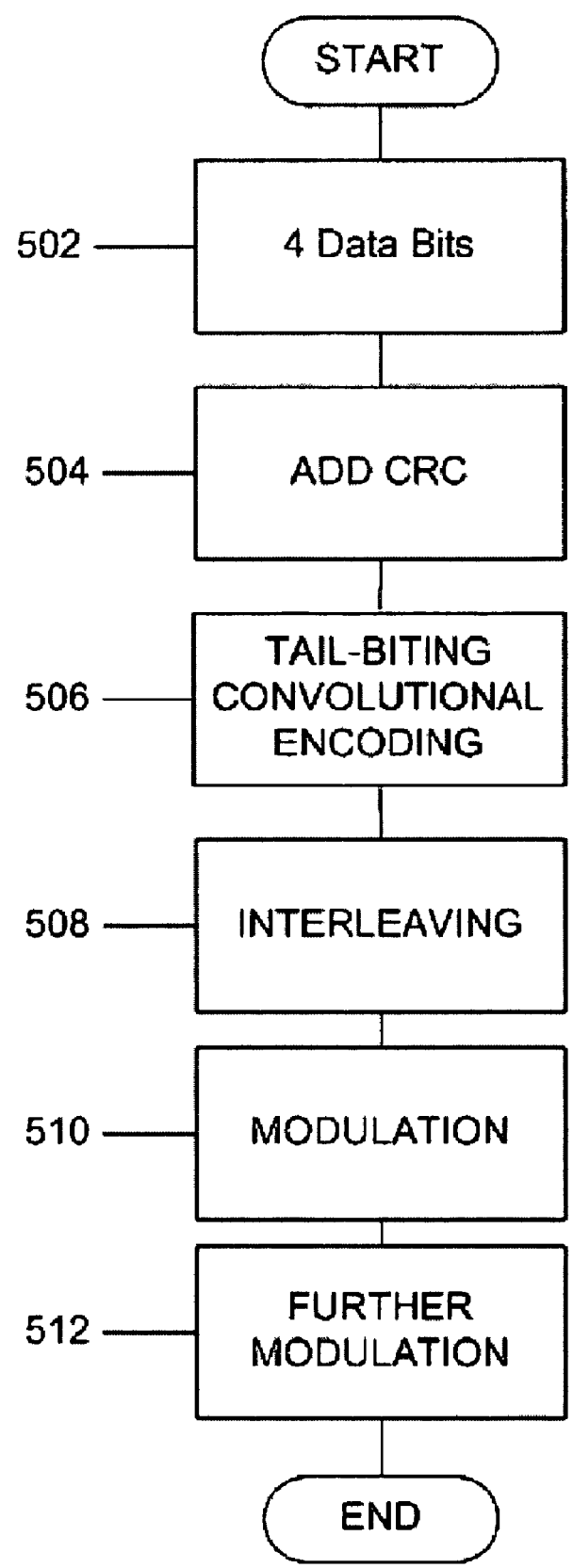
FIG. 5 is a flow chart illustrating an example method for encoding a data control channel in accordance with one embodiment.

FIG. 5 is a flow chart illustrating an example method for encoding a control channel in accordance with one embodiment of the systems and methods described herein. First, in step 502, the data bits (b) are generated. In step 504, CRC bits (c) can be generated from, and added to the data bits (b). In step 506, the resulting input symbols can be encoded using a tail-biting convolutional encoding process to generate output symbols. In certain embodiments, the output symbols can be interleaved in step 508. The output can then be modulated, e.g., using BPSK, QPSK, QAM, etc., in step 510. Finally, the modulated output can then be further modulated for transmission, e.g., using CDMA or OFDM, in step 512.

Figure 6:
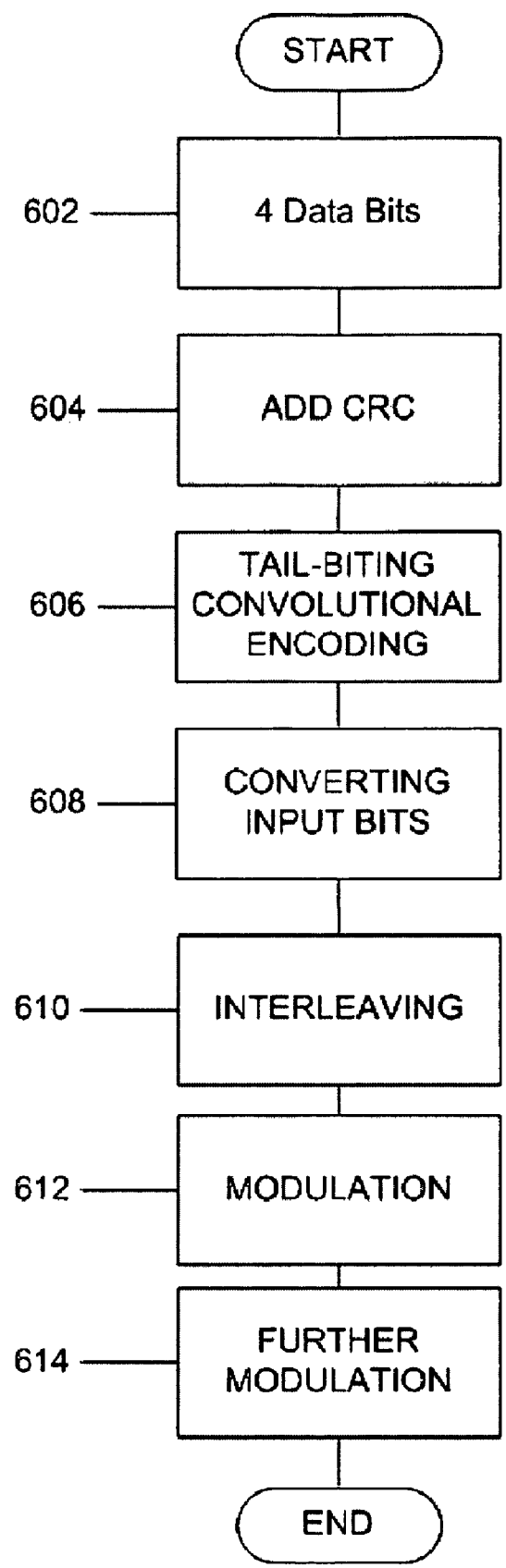
FIG. 6 is a flow chart illustrating an example method for encoding a data control channel in accordance with a second embodiment.

FIG. 6 is a flow chart illustrating an example method for encoding a control channel in accordance with one embodiment of the systems and methods described herein. First, in step 602, the data bits (b) are generated. In step 604, CRC bits (c) can be generated from, and added to the data bits (b). In step 606, the resulting input symbols can be encoded using a tail-biting convolutional encoding process to generate output symbols. In step 608, the output symbols (k) can be converted into a sequence of (n) bits using the formula R=k/n, wherein (R) is the effective rate of the encoder and k=b+c, wherein (b) is a plurality of bits generated by the CRC from the information bits and (c) is the number of CRC bits generated by the CRC encoding block. The output symbols of step 608 can be interleaved in step 610. In some embodiments, the output symbols of step 606 can be interleaved before converting into a sequence of (n) bits in step 608. The output can then be modulated, e.g., using BPSK, QPSK, QAM, etc., in step 612. Finally, the modulated output can then be further modulated for transmission, e.g., using CDMA or OFDM, in step 614.

Figure 7:
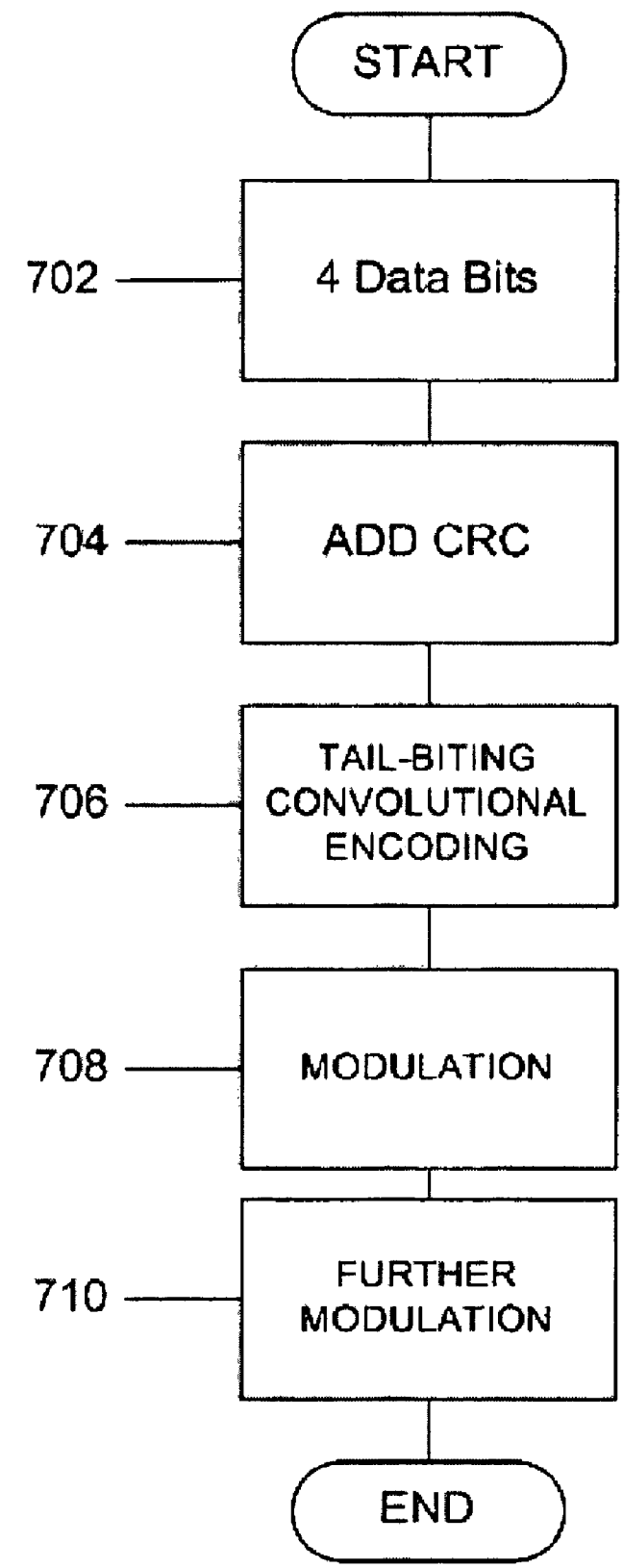
FIG. 7 is a flow chart illustrating an example method for encoding a data control channel in accordance with a third embodiment.

FIG. 7 is a flow chart illustrating an example method for encoding a control channel in accordance with one embodiment of the systems and methods described herein. First, in step 702, the data bits (b) are generated. In step 704, CRC bits (c) can be generated from, and added to the data bits (b). In step 706, the resulting input symbols can be encoded using a tail-biting convolutional encoding process to generate output symbols. The output can then be modulated, e.g., using BPSK, QPSK, QAM, etc., in step 710. Finally, the modulated output can then be further modulated for transmission, e.g., using CDMA or OFDM, in step 712.

As noted, the control channel encoding can be performed in a base station, or an access point for communicating the control to wireless communication devices with which it is in communication. It should also be noted that for best performance, the diversity, e.g., in time and/or frequency should be maximized.

While certain embodiments of the inventions have been described above, it will be understood that the embodiments described are by way of example only. Accordingly, the inventions should not be limited based on the described embodiments. Rather, the scope of the inventions described herein should only be limited in light of the claims that follow when taken in conjunction with the above description and accompanying drawings.

What is claimed is:

1. A transmitter comprising a channel encoder configured to encode information bits onto a control channel, the transmitter comprising:
   a cyclical redundancy check (CRC) encoding block configured to receive the information bits, generate CRC bits, and add the CRC bits to the information bits forming input symbols;
   a tail-biting convolutional encoder coupled with the CRC encoding block, the tail-biting convolutional encoder configured to generate output symbols from the input symbols using a tail biting technique, wherein said tail-biting convolutional encoder convert (k) input bits into a sequence of (n) bits using the formula R=k/n, wherein (R) is the effective rate of the encoder and k=b+c, wherein (b) is a plurality of bits generated by the CRC from the information bits and (c) is the number of CRC bits generated by the CRC encoding block; and
   a modulation block configured to modulate the output symbols.

2. The transmitter of claim 1, further comprising an interleaving block coupled with the tail-biting convolutional encoder, the interleaving block configured to interleave the output symbols, and pass the interleaved output symbols to the modulator block.

3. The transmitter of claim 2, wherein the information bits are selected from the group consisting of the Forward-Pilot Quality Indicator Channel (F-PQICH) bits; the Forward-Fast Other sector Interference Channel (F-FOSICH) bits; and the Forward-Interference Over Thermal Channel (F-IOTCH) bits.

4. The transmitter of claim 1, wherein the modulation block modulates the output symbols using the modulation method selected from the group consisting of Bi-Phase Shift Keying (BPSK); Quadrature Phase Shift Keying (QPSK); and Quadrature Amplitude Modulation (QAM).

5. The transmitter of claim 1, wherein the CRC encoding block is further configured to invert the CRC bits before adding them to the information bits.

6. The transmitter of claim 1, wherein the tail-biting convolutional encoder is configured to have an effective rate (R) of ½ and to receive a 6-bit input symbols, wherein 4-bit is information bits (b), and 2-bit is CRC bits (c).

7. A method for encoding information bits onto a preamble channel, comprising:
   receiving the information bits;
   generating CRC bits, configure to do the CRC check of the information bits;
   adding the CRC bits to the information bits forming input symbols at an effective rate (R);
   generating output symbols from the input symbols using a tail biting technique;
   converting (k) input bits into a sequence of (n) bits, configured by the formula R=k/n, wherein k=b+c and (b) is a plurality of bits generated from the information bits and (c) is the number of CRC bits; and
   modulating the output symbols.

8. The method of claim 7, further comprising:
   interleaving the output symbols; and
   passing the interleaved output symbols for said modulating.

9. The method of claim 8, wherein the information bits are selected from the group consisting of the Forward-Pilot Quality Indicator Channel (F-PQICH) bits; the Forward-Fast Other sector Interference Channel (F-FOSICH) bits; and the Forward-Interference Over Thermal Channel (F-IOTCH) bits.

10. The method of claim 7, wherein said modulating the output symbols comprises the modulation method selected from the group consisting of Bi-Phase Shift Keying (BPSK); Quadrature Phase Shift Keying (QPSK); and Quadrature Amplitude Modulation (QAM).

11. The method of claim 7, wherein said forming input symbols further comprises inverting the CRC bits before adding them to the information bits.

12. The method of claim 7, wherein said forming input symbols comprises having an effective rate (R) of ½, wherein said forming a 6-bit input symbols, 4-bit is information bits (b), and 2-bit is CRC bits (c).

13. An access point, comprising:
   a receiver configured to receive coded signals;

a transmitter configured to generate coded signals for transmission, the transmitter comprising a channel encoder configured to encode information bits, the channel encoder comprising:

a cyclical redundancy check (CRC) encoding block configured to receive the information bits, generate CRC bits, and add the CRC bits to the information bits forming input symbols;

a tail-biting convolutional encoder coupled with the CRC encoding block, the tail-biting convolutional encoder configured to generate output symbols from the input symbols using a tail biting technique and convert (k) input bits into a sequence of (n) bits, configured by the formula R=k/n, wherein (R) is the effective rate of the encoder and k=b+c, wherein (b) is a plurality of bits generated by the CRC from the information bits and (c) is the number of CRC bits generated by the CRC encoding block; and a modulation block configured to modulate the output symbols.

14. The access point of claim 13, further comprising an interleaving block coupled with the tail-biting convolutional encoder, wherein the interleaving block is configured to interleave the output symbols and pass the symbols to the modulation block.

15. The access point of claim 14, wherein the information bits are selected from the group consisting of the Forward-Pilot Quality Indicator Channel (F-PQICH) bits; the Forward-Fast Other sector Interference Channel (F-FOSICH) bits; and the Forward-Interference Over Thermal Channel (F-IOTCH) bits.

16. The access point of claim 13, wherein the modulation block modulates the output symbols using the modulation method selected from the group consisting of Bi-Phase Shift Keying (BPSK); Quadrature Phase Shift Keying (QPSK); and Quadrature Amplitude Modulation (QAM).

17. The access point of claim 13, wherein the CRC encoding block is further configured to invert the CRC bits before adding them to the information bits.

18. The access point of claim 13, wherein the tail-biting convolutional encoder is configured to have an effective rate (R) of ½ and receive a 6-bit input symbols, wherein 4-bit is information bits (b), and 2-bit is CRC bits (c).

19. A mobile unit, comprising:

a receiver configured to receive coded signals;

a transmitter configured to generate coded signals for transmission, the transmitter comprising a channel encoder configured to encode information bits, the channel encoder comprising:

a cyclical redundancy check (CRC) encoding block configured to receive the information bits, generate CRC bits, and add the CRC bits to the information bits forming input symbols;

a tail-biting convolutional encoder coupled with the CRC encoding block, the tail-biting convolutional encoder configured to generate output symbols from the input symbols using a tail biting technique and convert (k) input bits into a sequence of (n) bits, configured by the formula R=k/n, wherein (R) is the effective rate of the encoder and k=b+c, wherein (b) is a plurality of bits generated by the CRC from the information bits and (c) is the number of CRC bits generated by the CRC encoding block; and a modulation block configured to modulate the output symbols.

20. The mobile unit of claim 19, further comprising an interleaving block coupled with the tail-biting convolutional encoder, wherein the interleaving block configured to interleave the output symbols and pass the symbols to the modulation block.

* * * * *